United States Patent [19]

Oplet et al.

[11] Patent Number: 5,052,732

[45] Date of Patent: Oct. 1, 1991

[54] CRASH ATTENUATOR UTILIZING FIBROUS HONEYCOMB MATERIAL

[75] Inventors: David W. Oplet, Belleville; Charles Kern, Keysport, both of Ill.

[73] Assignee: Renco Supply, Inc., Pflugerville, Tex.

[21] Appl. No.: 503,223

[22] Filed: Apr. 2, 1990

[51] Int. Cl.$^5$ .............................. B60R 19/26
[52] U.S. Cl. ................................. 293/102; 293/103; 293/118; 428/116; 188/377
[58] Field of Search ............... 293/133, 118; 188/377; 428/116, 118, 73

[56] References Cited

U.S. PATENT DOCUMENTS

| | | | |
|---|---|---|---|
| 4,635,981 | 1/1987 | Friton | 293/133 |
| 4,711,481 | 12/1987 | Krage et al. | 293/133 |
| 4,770,420 | 9/1988 | Gottwald et al. | 293/133 |

OTHER PUBLICATIONS

"Crush Pad Test Summary", a summary paper by J. H. Adams, Jr.—NASA Report, Jul. 7, 1970.

Technical Services Bulletin No. 121, Jul. 1987, by International Honeycomb Corporation.

Primary Examiner—Robert R. Song
Attorney, Agent, or Firm—Ross, Howison, Clapp & Korn

[57] ABSTRACT

A crash attenuator (10) includes a plurality of layers (22) of fibrous cellular material. Each of the layers is comprised of a plurality of hexagonal elongate cells fabricated of a fibrous cellulose material that has a longitudinal axis that is disposed horizontal to the ground such that the edge of the cell is directed toward the impacting vehicle. A flat sheet of fibrous material (24) is disposed between each of the layers to provide an energy dispersing surface. A rear impact plate (18) is disposed on the impacting end of the crash attenuator (10) and is fabricated from a soft metal. A front mounting plate (20) is disposed on the opposite end thereof and the two secured by tension cables (42). The exterior of the layers (22) is covered by sheets (26) and (46). Thereafter, a layer of moisture proof material (78) is disposed over the surface of the crash attenuator (10) to prevent moisture from entering the interior.

12 Claims, 6 Drawing Sheets

CRASH ATTENUATOR UTILIZING FIBROUS HONEYCOMB MATERIAL

TECHNICAL FIELD OF THE INVENTION

The present invention pertains in general to crash attenuators, and more particularly, to a crash attenuator utilizing a fibrous honeycomb material to absorb impacts and decrease the amount of deceleration forces imparted to a vehicle.

BACKGROUND OF THE INVENTION

In highway construction, the use of crash attenuators has seen increased use due to rising liability costs, congestion of highways and the need for expanding present road systems without closing them to traffic. These crash attenuators are utilized on abutments, bridge columns and even on the rear of parked construction and maintenance vehicles.

One type of attenuator that has seen widespread use in recent years is a truck mounted attenuator which is operable to be disposed on the rear of a sand truck that is utilized by a road crew. This truck is typically utilized as a barrier at the rear of the construction project. Therefore, if a vehicle fails to notice warning signs indicating ongoing construction, the vehicle will impact the rear of this truck having the attenuator mounted thereon. The attenuator will absorb the impact, both preventing damage to the truck and the individuals that may be occupying the truck, and also minimize damage to the impacting vehicle.

These previous truck mounted attenuators have utilized an enclosure which is mounted on a lift on the rear bumper of the truck. This lift is operable to dispose the attenuator in either a horizontal position or in a vertical position. In the horizontal position, the attenuator extends outward and rearward of the truck. The attenuator is comprised of an enclosure in which elongated hexagonal shaped cells are disposed. The walls of these cells are fabricated of a lightweight aluminum and are oriented such that the longitudinal axis thereof is horizontal to the ground. This provides the maximum compression forces for relatively lightweight material. Although these cells are only filled with air, some applications of these hexagonal cells have utilized a foam filling.

The hexagonal cells have typically been fabricated from a non-corrosive material and disposed in a sheet metal or aluminum housing. When the housing is impacted, it ruptures and allows the rear face thereof to move forward into the impact absorbing material to cause it to compress. This compression is what provides the energy absorption, thus decelerating the impacting body.

Another type of crash attenuator has been fabricated from the solid block of foam. The foam is covered with an outside enclosure and then mounted on a lift on the rear of the vehicle. Typically, the enclosure for this type of attenuator is comprised of fiberglass. One disadvantage to this type of structure is that when the compressed attenuator has been impacted with a vehicle, the fiberglass has a tendency to shatter, thus hurling fragments in many directions. This could result in a safety hazard.

One disadvantage with present crash attenuators is the material which is utilized internal to the enclosure. When an aluminum hexagonal cell material is utilized, this can result in the possibility of corrosion, in addition to the expense of fabrication. The external enclosure, while allowing moisture to leak out, can result in a safety hazard when the enclosure ruptures.

SUMMARY OF THE INVENTION

The present invention disclosed and claimed herein comprises a crash attenuator. The attenuator includes an impact plate for defining the rear of the crash attenuator and for being disposed perpendicular to the impact and dispersing the impact force over a wide surface area. A mounting plate is provided for defining the front of the crash attenuator and having a surface area at least equal to that of the impact plate and parallel thereto. An energy absorbing body is provided that is comprised of a fibrous cellular material having a plurality of elongated cells with fibrous walls. The fibrous cellular material in the energy absorbing body is disposed between the impact plate and the mounting plate with the longitudinal axis of the cells oriented in a plane perpendicular to the impact plate and the mounting plate and parallel to the surface over which the crash attenuator is disposed. An attachment device is provided for securing the mounting plate and the impact plate against the opposite ends of the energy absorbing body and securing them thereto. A moisture proof covering is provided over at least the energy absorbing body. A mounting bracket is provided on the mounting plate to allow the mounting plate to be fixed to a secure surface.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
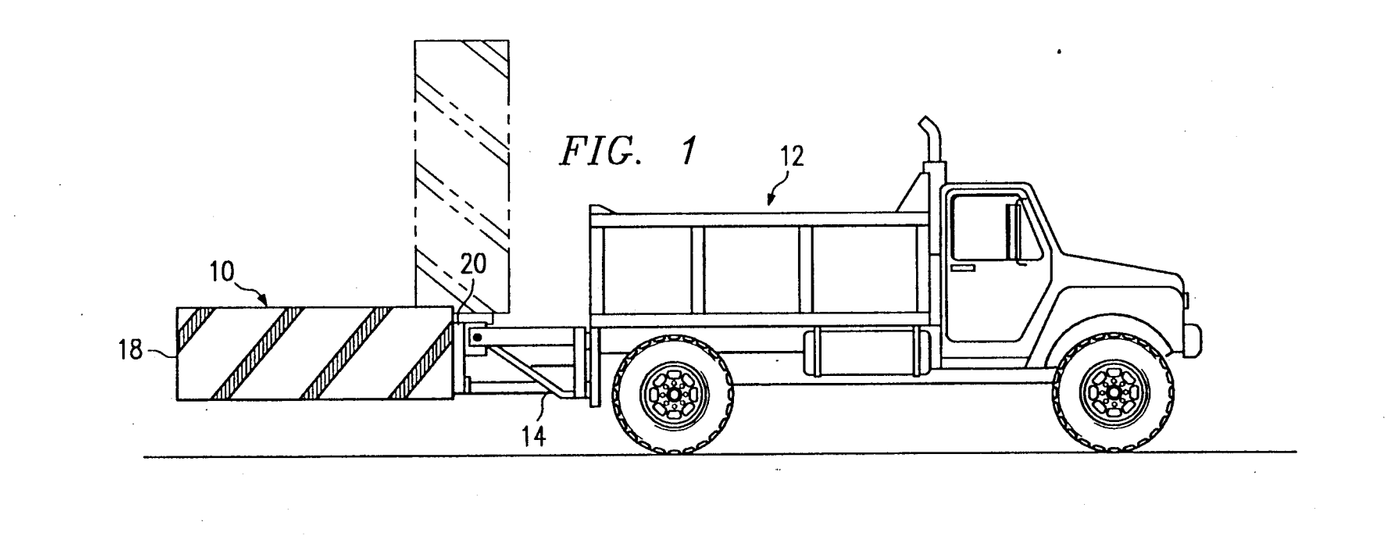
FIG. 1 illustrates a side view of the crash attenuator mounted on the rear of a truck in the ready position with the transport position illustrated in phantom.

Referring now to FIG. 1 there is illustrated a side view of a crash attenuator 10 mounted to the rear of a vehicle 12 with a mounting bracket 14. The mounting bracket 14 is operable to rotate the crash attenuator 10 from a horizontal position to a vertical position illustrated in phantom. The vertical position is utilized for transporting the crash attenuator 10. Typically, the mounting bracket 14 is located at a position on the rear of the truck 12 at a distance approximating twelve inches above the ground.

Figure 2:
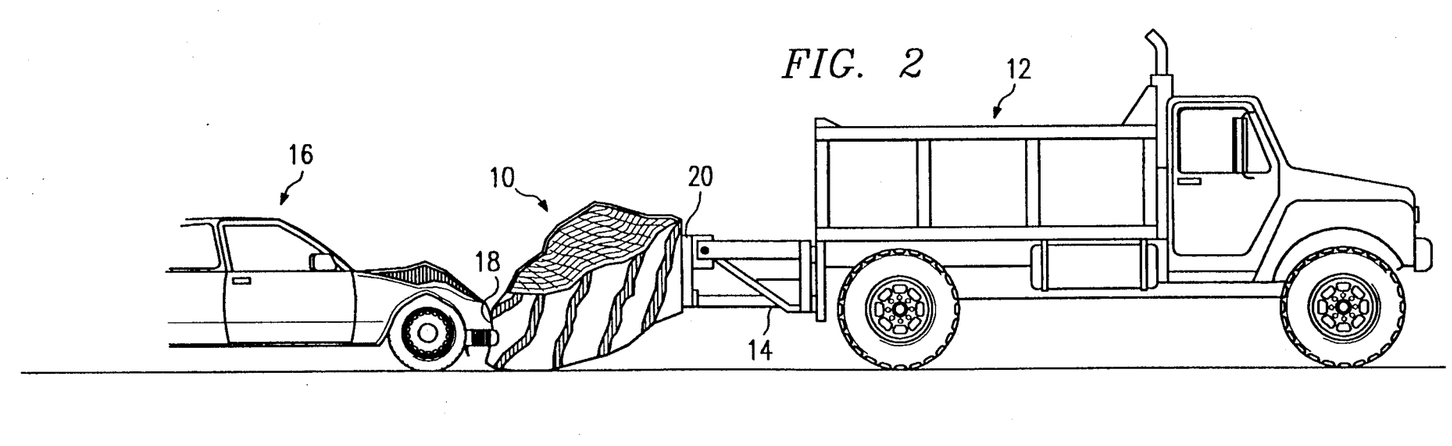
FIG. 2 illustrates a side view of the crash attenuator after being impacted by a vehicle.

Referring now to FIG. 2, the crash attenuator 10 is illustrated after impact from a vehicle 16. It can be seen that the vehicle 16 strikes an impact plate 18 on rear of the crash attenuator 10 and pushes the impact plate 18 through the body of the crash attenuator 10 toward the mounting bracket 14. A mounting plate 20 is provided for mounting the attenuator 10 to the mounting bracket 14.

When the vehicle 16 initially impacts the impact plate 18, an initial decelerating force is imparted to the vehicle 16. This typically is measured in G-forces, which forces represent a measure of gravity with one G equal to the earth's gravity, two G's equal to twice the earth's gravity, etc. The object of the crash attenuator 10 is to provide an even decelerating force that increases from zero at impact to a maximum value, this value being maintained relatively constant as the crash attenuator 10 is compressed. The speed of the vehicle 16 is decreased to a value of zero prior to total compression of the crash attenuator 10. In this manner, an even deceleration can be imparted to the vehicle 16 with relatively little force imparted to the vehicle 12. Typically, in tests conducted with crash attenuators, movement of truck 12 with the brakes locked provides an indication of the force imparted to the truck 12. Although some force will be imparted to the truck 12, the object of the crash attenuator 10 is to minimize this force.

Figure 3:
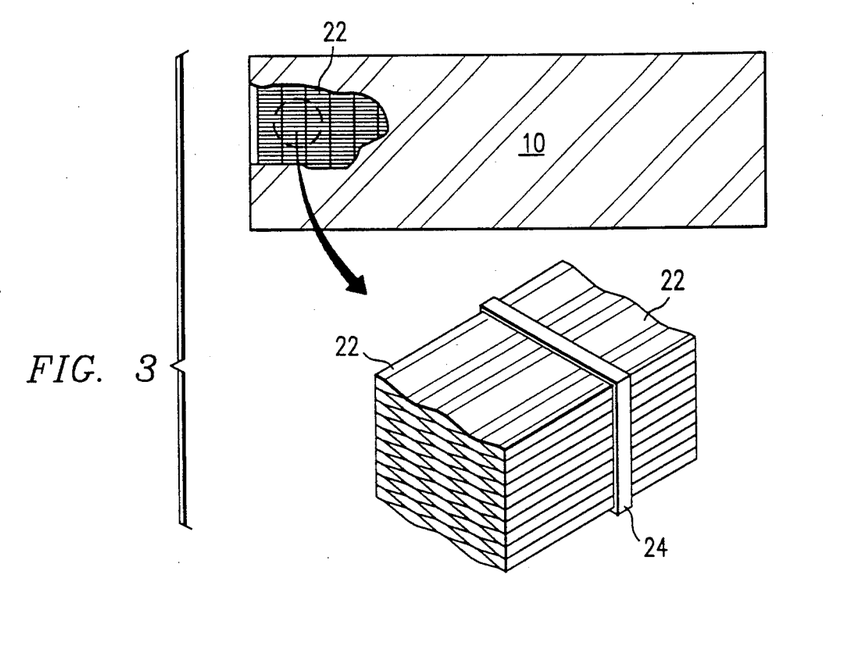
FIG. 3 illustrates a side cutaway view of the crash attenuator and the fibrous honeycomb material.

Referring now to FIG. 3, there is illustrated a detail of the absorption material in the crash attenuator 10. In the preferred embodiment of the present invention, the crash attenuator 10 utilizes a plurality of layers of honeycomb fibrous material 22 formed from a plurality of adjacently disposed elongated cells. Each layer 22 is approximately three inches thick with each honeycomb cell being substantially hexagonal in cross-section. The cross-sectional dimension of the cell is approximately 1 inch at the maximum. Each of the honeycomb cells has a longitudinal axis and a cross-sectional axis, the longitudinal axis being defined along the length of the honeycomb cell. The layers 22 are oriented such that the longitudinal axis is disposed parallel to the ground with all the cells thereby imparting the maximum compressive forces along the longitudinal axis. Therefore, when an impact is directed at the edge of the honeycomb cell perpendicular to the longitudinal axis, the wall structure of the cell collapses but provides a surprisingly high level of strength in that direction. This is to be compared with prior art systems that utilize a metal honeycomb structure.

Each of the layers 22 are separated by a fibrous sheet 24. In the preferred embodiment, the layers 22 are manufactured as a unit with the distal ends thereof surfaced with a single sheet. When two layers 22 are disposed adjacent each other, they are glued together to form one single sheet 24 therebetween. The sheet 24 provides two advantages. First, when an impact is imparted to one end of the layer 22 and substantially perpendicular thereto, this impact traverses along the wall of each of the cells to the sheet 24 on the opposite end thereof. At the sheet 24, the forces are spread and transferred to the next adjacent layer 22. This has the effect of preventing an uneven force distribution at one end from being propagated through a very small section of the crash attenuator 10. The sheets 24 cause a spreading of the force between layers 22 to more evenly distribute the force through the crash attenuator 10.

As a second advantage, the sheet 24 increases the shear forces between the layers 22. If the fibrous honeycomb cells having a length equal to that of the crash attenuator 10 were utilized, there would be a finite length at which the overall crash attenuator 10 would "sag" without some support. This length can be increased with the use of a plurality of layers 22 separated by the sheet 24. In the preferred embodiment, the crash attenuator 10 has a length of seven feet, a width of eight feet and a height of two feet.

Figure 4:
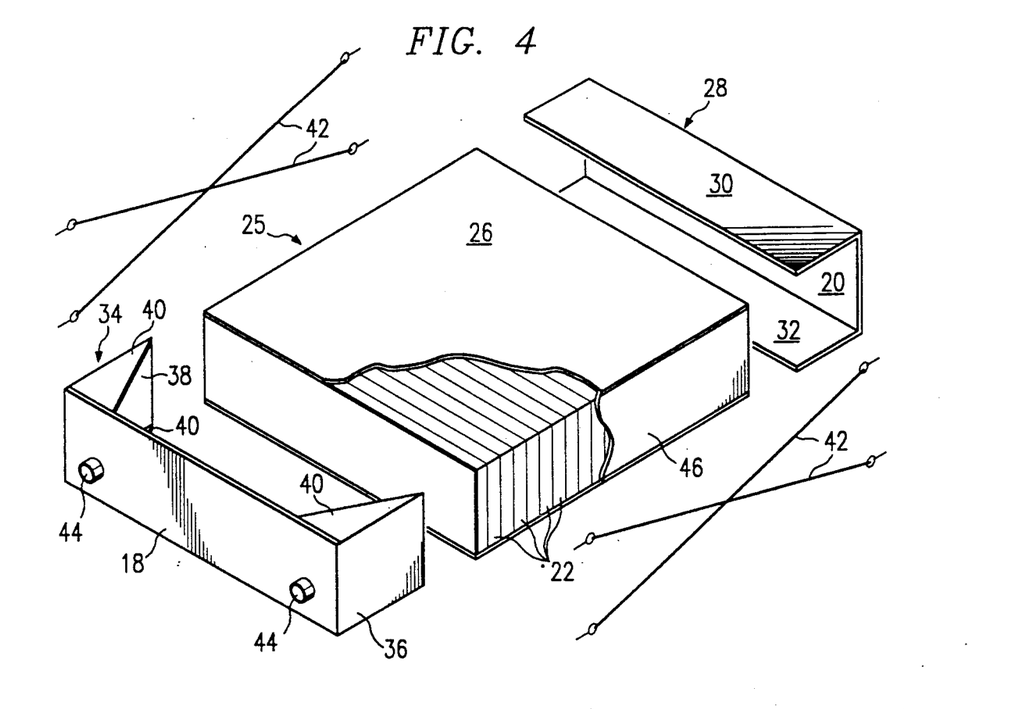
FIG. 4 illustrates an exploded view of the crash attenuator illustrating the front and rear support sections and the torsion cable.

Referring now to FIG. 4, there is illustrated an exploded view of the internal construction of the crash attenuator 10 in the preferred embodiment. The layers 22 are disposed adjacent each other and move together with the separating sheets 24 disposed therebetween to form a an energy absorbing body 25. This energy absorbing body is rectangular in shape. A flat sheet of honeycomb fibrous material 26 is disposed on the upper surface of the body 25 external to layers 22. A similarly shaped flat honeycomb fibrous layer is disposed on the lower surface thereof (not shown). The fibrous layer 26 and the corresponding layer on the lower surface of the layers 22 provide a seal for the sides of the layers 22. A supporting bracket 28 is provided which incorporates the mounting bracket 20. The mounting bracket 20 provides one side of the supporting bracket 28, the mounting bracket 20 providing a vertical plate that is parallel to the front surface of the crash attenuator 10. The mounting bracket 28 has an upper flat surface 30 that is disposed perpendicular to the plane of the mounting plate 20 with one edge thereof intersecting the upper edge of the mounting bracket 20. In a similar manner, a lower flat surface 32 is provided which is parallel to the flat surface 30 and disposed on the opposite side of the mounting plate 20 along the edge thereof. The flat surface 32 provides a resting surface for the rear portion of the energy absorbing body 25 and extends outward from the rear mounting plate 20 a farther distance than the upper flat surface 30. Therefore, mounting bracket 28 provides two functions; first, it provides the rear mounting plate 20 and secures it to the rear section of the energy absorbing body 25 to disperse the impact forces thereacross; and secondly, the lower surface 32 provides a surface upon which the rear portion of the energy absorbing body 25 can rest.

A mounting bracket 34 is provided which incorporates the impact plate 18. The impact plate 18 has disposed thereon two side surfaces which extend at an angle perpendicular to the plane of the impact plate 18 and attached to the sides thereof such that they extend back along the sides of the energy absorbing body 25. Each of the plates 36 and 38 have a retaining bracket 40 disposed between the upper and lower edges thereof and the upper and lower edges of the plate 18 that are formed in the shape of a triangle with three sides. In this manner, the edges of the energy absorbing body 25 on the rearmost portion thereof are contained within the impact plate 18, the end plates 36 and the retaining brackets 40.

Figure 5:
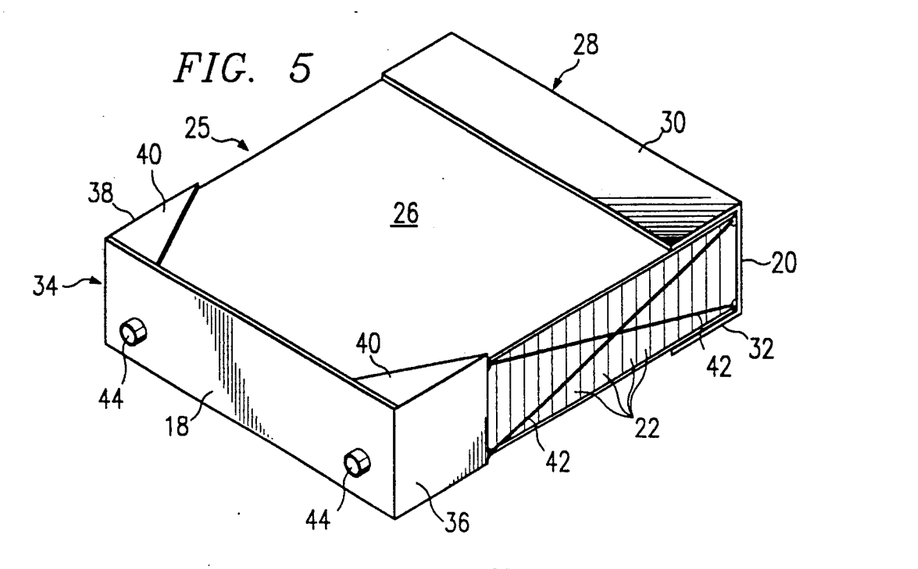
FIG. 5 illustrates the crash attenuator after disassembly and prior to coating.

Once the rear mounting bracket 28 and the front mounting bracket 34 are disposed over opposite ends of the energy absorbing body 25, it is necessary to secure them thereto. Although the energy absorbing body 25 need only be held at the forwardmost end thereof to support the rearmost impacting end thereof, tension cables 42 are provided on either side of energy absorbing body 25, the tension cables 42 connected between opposite corners of the rear mounting bracket 34 and front mounting bracket 28 on opposite corners thereof. Therefore, the upper corner on one side of the mounting bracket 28 is attached to the lower corner of the plate 36 on the same side thereof. A predetermined amount of torque is applied to the cables 42 to adequately compress the combined assembly of the mounting bracket 34 and the energy absorbing mounting bracket 28 and the energy absorbing body 25. The assembled unit is illustrated in FIG. 5.

On the surface of the impact plate 18, two tail lights 44 are disposed in holes disposed through the mounting plate 18. The mounting of the tail lights 44 is a releasable mounting such that whenever pressure is exerted on the surface of the impact plate 18, the tail lights 44 will be pushed outward therefrom, this operation will be described in more detail hereinbelow. After the cables 42 are assembled, a side layer 46 of corrugated fibrous material is disposed over each side of the energy absorbing body 25 to cover the cables 42. This is illustrated in place in FIG. 4 and removed for illustrative purposes in FIG. 5.

Figure 6:
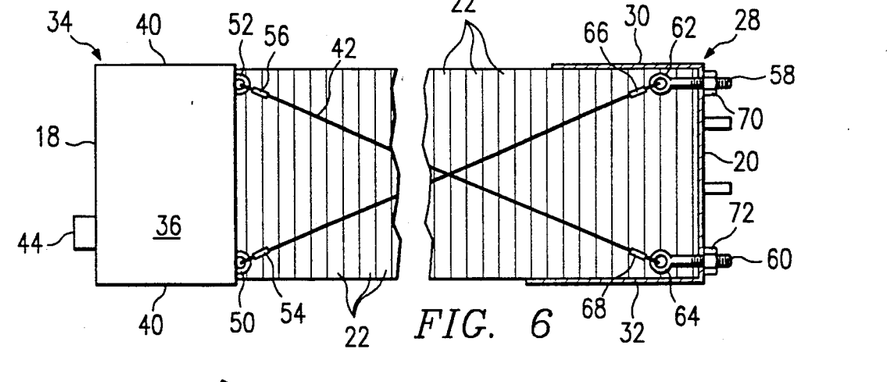
FIG. 6 illustrates a detailed side view of the crash attenuator illustrating the torsion cable connection.

Referring now to FIG. 6, there is illustrated a side detail view of the interconnection of the cables 42. An eyelet 50 is provided on the lower corner of plate 36 and an eyelet 52 is provided on the upper corner thereof. One end of the cable 42 has a hook attached thereto which is operable to be disposed through the eyelet 50. The corresponding other cable 42 has a hook 56 disposed on the end thereof that is operable to be disposed through the eyelet 52. In a similar manner, on the upper corner of mounting bracket 28 and on the plate 20, a tension bolt 58 is provided. A similar tension bolt 60 is provided on the lower corner thereof. The tension bolt 58 has an eyelet 62 disposed on the opposite end thereof on the inner side of the mounting bracket 28. Similarly, the tension bolt 60 has an eyelet 64 disposed on the side thereof interior to the mounting bracket 28. The cable 42 corresponding to the upper cable thereof has a hook 66 disposed on the opposite end thereof to interface with the eyelet 62. The lower cable 42 has a hook 68 disposed on the end thereof for interfacing with the eyelet 64. Once the cables 42 are disposed between eyelets 50 and 52 and eyelets 62 and 64, nuts 70 and 72 are tightened onto the bolts 58 from the exterior of the mounting plate 28 to a predetermined torque. This provides a slight compression to the energy absorbing body 25 and the adjacent layers 22 of absorbing material.

After the initial assembly has been made, the seams are taped together. In this manner, the exterior surfaces of the energy absorbing body 25 of the adjacent layers 22 of absorbing material can be sealed to provide a relatively smooth surface. As will be described hereinbelow, a layer of moisture proof material is sprayed onto the exterior surfaces of the assembled crash attenuator 10. Although the moisture proof material is of sufficient thickness and sufficient conformability, for aesthetic reasons, it is desirable to have a relatively smooth surface on which to dispose the moisture proof material. Therefore, the layers 26 and 46 on the upper surface and side surfaces, respectively, of the energy absorbing body 25, are employed. Thereafter, tape is utilized to tape all seams to provide a substantially smooth surface at all points one of the crash attenuator. After the edges have been taped, a two component aromatic polyurethane material is sprayed onto the surface in multiple coats.

The material utilized for the two component aromatic polyurethane is manufactured by Independent Chemical Company in Bridgman, Minn. under the material name BC-2320-A. This material provides a 100% solids (solventless) flexible system to provide both toughness and impact resistance. The physical properties of the material are as follows:

| Flex Strength | 106.18 |
|---|---|
| Flex Modulas | 24,236 |
| Tensile Strength | 2694.6 |
| % Elongation at Break | 433.167 |
| Stress A 0.2% Yield | 440.6 |
| Youngs Modulas KSI. | 4,936 |
| H.D.T. at 66 psi | 72 |
| Shore D Hardness | 56 |
| Density Lbs./CU.FT. | 59.5 |

The material comprises two layers, the first layer, material number BC-2320-A, is comprised of 62.5% 44-diphenylmethane-diisocyanate and modified MDI. A second layer is defined under material BC-2320-B in the product class POLYOL which is a blend of polyalcohols and alcoholamines. This is a proprietary blend of two common ingredients not having been disclosed to Applicant.

Figure 7:
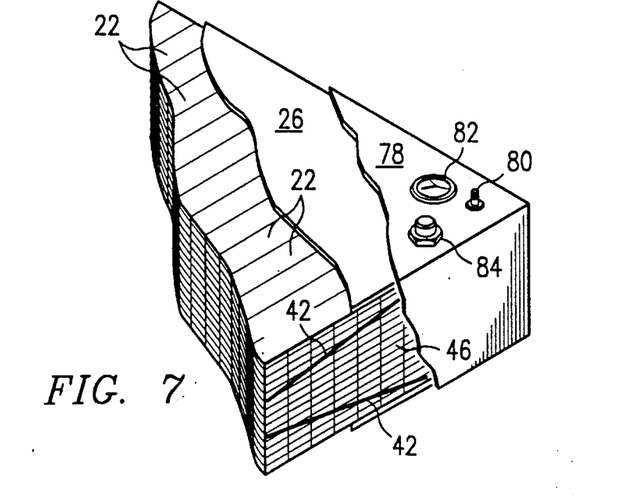
FIG. 7 illustrates a sectional view after coating with the exterior protective material.

Referring now to FIG. 7, there is illustrated a detail of the final assembly showing the various components. The exterior urethane coating is illustrated by reference numeral 78. Urethane coating 78 covers the exterior surface of the corrugated sheets 26 and 46 on the upper and side surfaces, respectively, of the energy absorbing body 25. These sheets 26 and 46 cover the adjacent layers 22 of energy absorbing material.

Since the moisture proof material of exterior covering 78 provides an entirely sealed surface, the interior thereof provides a moisture proof sealed enclosure. Since the fibrous material of the layers 22 is absorbent to moisture, it is important that moisture be prevented from entering the crash attenuator. If cracks or the such develop in the covering layer 78, these can be patched. In a further embodiment of the present invention, the enclosure is pressurized to a very low pressure above that of the atmosphere through an air inlet 80. A gauge 82 is provided on the exterior surface of the enclosure 78 to provide an indication that the pressure on the interior thereof is above the exterior pressure. In this manner, the existence of a positive pressure within the interior of the crash attenuator 10 will indicate that no cracks are present. Since the entire absorbing material in layers 22 is porous, any air that enters a given point within the interior of the crash attenuator will permeate through the pores of the absorbing material to all points therein. Therefore, a pressure reading at any point within the interior of the crash attenuator will indicate the pressure at all points.

Since only a finite pressure can be maintained within the interior of the crash attenuator, a pressure relief valve 84 is provided. Typically, this pressure relief valve will be set to a very low setting. Although experimentation has not been performed, it is anticipated that the interior pressure will range between five to seven pounds. Therefore, to maintain the integrity of the crash attenuator it is only necessary for an operator to view the gauge 82 to ensure that no leaks or cracks have developed in the exterior thereof and, if so, these need only be patched with a repair kit. Although the gauge 82, the air inlet 80 and the pressure relief valve 84 are illustrated on the top of the attenuator 10, in the preferred embodiment, these elements are located on the rear of the attenuator 10.

Figure 8:
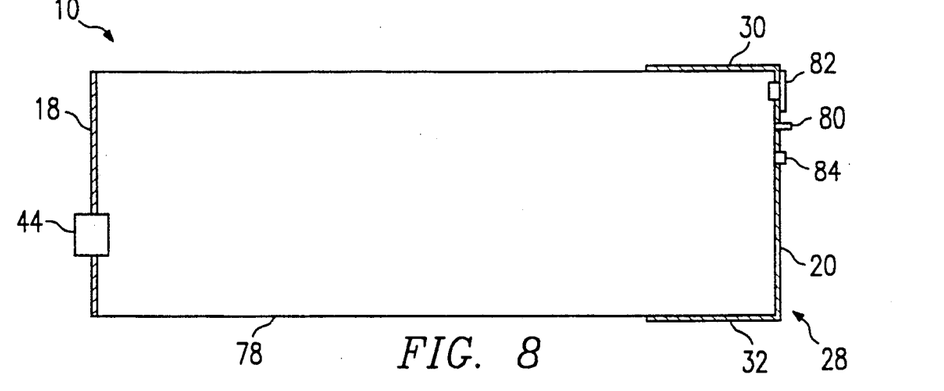
FIG. 8 illustrates a cross sectional view of the pressure release mechanism and also the pressurizing system.

Referring now to FIG. 8, there is illustrated a cross sectional view of the crash attenuator 10. For simplicity purposes, the absorbing material is not illustrated. When a vehicle impacts the plate 18, the force is spread in a relatively uniform manner across the impact plate 18. This is due to the fact that the impact plate 18 is manufactured from a soft aluminum that has some "give" associated therewith to allow it to conform to the shape of the impacting vehicle. Alternatively, the impact plate 18 can be fabricated from a sheet of construction grade plywood. If the impacting vehicle is relatively narrow, the impact plate 18 is still operable to spread the surface area of the impact out across the entire surface of the impact plate 18. When the impact plate 18 is urged toward the mounting bracket 28 and the mounting plate 20, the enclosure of the crash attenuator 10 begins to deform. This results in a compression of the overall enclosure. When this compression occurs, the pressure therein builds up. Although the energy absorbing material (not shown) resists this compression to some extent, the deformity eventually occurs.

In order to prevent pressure buildup in the enclosure of the crash attenuator 10, thus possibly resulting in an air cushion, the lining 78 is designed to rupture. Further, there are a number of release points. The release valve 84 is one release point which does not allow much air flow therethrough. The second release point, and more importantly, are the tail lights 44 and the orifices through which they are attached. These tail lights are mounted such that they will be urged outward from the orifices in the plate 18 to allow any air pressure to escape from the interior of the crash attenuator 10. Further, the seams along the corner from the back to front are weak points in the structure which will rupture when impacted.

Upon impact, the impact plate 18 spreads the force over the entire surface of the crash attenuator 10 and this force is translated forward toward the rear mounting plate 20. This will therefore cause the fibrous absorption material contained in the interior of the crash attenuator 10 to compress.

Figure 9:
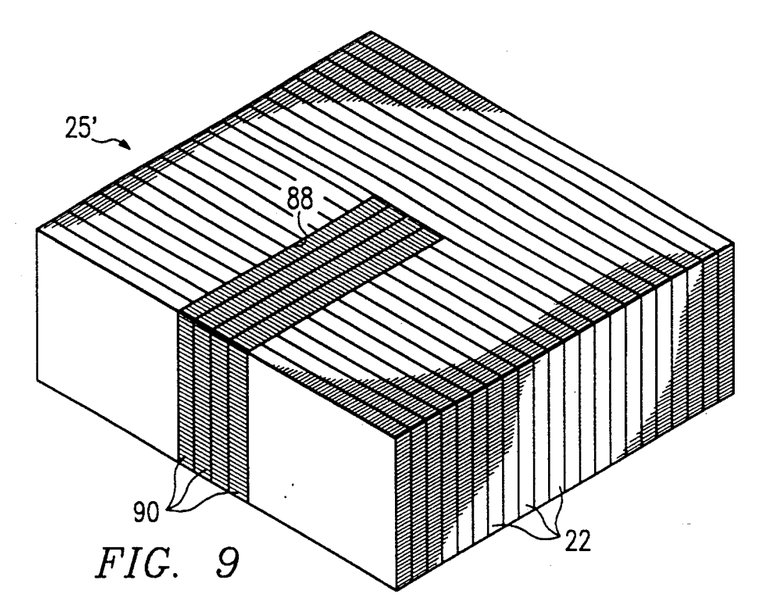
FIG. 9 illustrates an alternate embodiment of the present invention wherein tuning is incorporated in the rear of the crash attenuator.

Referring now to FIG. 9, there is illustrated an alternate embodiment of the present invention. The embodiment of the FIG. 9 illustrates an energy absorbing body 25' which is similar to the energy absorbing body 25. However, the energy absorbing body 25' has a central section 88 cut out from the adjacent layers 22. This cutout extends from the front of the energy absorbing body 25' adjacent to where the impact plate 18 will be disposed rearward approximately one-third the length of the crash attenuator 10. Layers 90 of the fibrous cellular material are then disposed in the cutout 88 and oriented at a 90° angle with respect to the layers 22. In this manner, the cross sectional axis of the cellular material in the layers 90 is disposed parallel to the longitudinal axis of the cellular material in the layers 22. This provides a "soft spot" in the central portion of the crash attenuator. Therefore, the primary portion of the force of the initial impact is borne by the outside edges of the crash attenuator 10. This is due to the fact that the resistance to compression of the cellular material in a direction along the cross sectional axis is minimal, the material having a tendency to compress very easily. This "soft spot" can be incorporated anywhere at any position in the crash attenuator to "tune" the crash attenuator.

Figure 10:
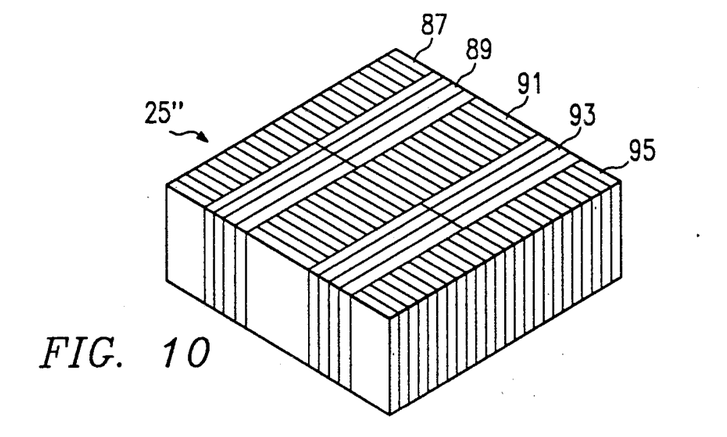
FIG. 10 illustrates an alternate embodiment of the present invention wherein the tuning is incorporated in parallel layers.

Referring now to FIG. 10, there is illustrated another embodiment of the present invention to adjust the impact absorption characteristics of the crash attenuator. An energy absorbing body 25" is illustrated which is comprised of a plurality of adjacent longitudinal layers 87, 89, 91, 93 and 95. These are alternating layers which run from the front to the back of the energy absorbing body 25'. The layers 87 and 95 are disposed on the outside edges of the energy absorbing body 25' with the layer 91 being centrally disposed between layers 87 and 95. Layer 89 is disposed between layers 87 and 91 and layer 93 is disposed between layers 91 and 95. The layers 87, 91 and 95 are operable to be "edge aligned" such that the longitudinal axis of the fibrous cellular material is disposed parallel to the road surface with the edge of the cellular fibrous material presented perpendicular to the impact surface at the rear of the crash attenuator 10. Therefore, this orientation is identical to that described above with respect to the embodiment of FIG. 1 and FIGS. 3-5. However, the layers 89 and 93 are configured such that the longitudinal axis of the cellular fibrous material is disposed with the longitudinal axis thereof parallel to the impact surface. Therefore, little or no energy absorbing effect is provided by layers 89 and 93. Since the impact plate 18 spreads the force out over the entire rear surface of the energy absorbing body 25", this impact force will be absorbed by the layers 87, 91 and 95. The layers 89 and 93, however, provide resistance in the lateral direction such that when the layers 87, 91 and 95 compress, they are prevented from "buckling" within the confines of the protective covering. Further, the layers 89 and 93 provide important support when the entire assembly is manufactured.

Figure 11:
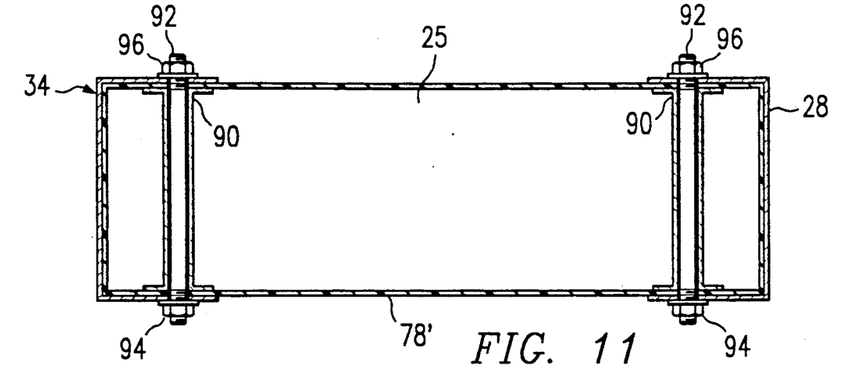
FIG. 11 illustrates an alternate embodiment of the assembly of the crash attenuator.

Referring now to FIG. 11, there is illustrated a cross sectional view of an alternate embodiment of the present invention. The energy absorbing body 25 is first fabricated as described above and then spindles 90 are disposed through the energy absorbing body 25 from top to bottom. The spindles provide a cylindrical bore from the top to the bottom of the energy absorbing body 25 at selected locations therein. After insertion of the spindles 90 at the select locations in the energy absorbing body 25, an outside protective layer 78' is disposed over the energy absorbing body 25, the substance of the energy absorbing body 25 not illustrated in FIG. 11. The coating 78' is identical to the coating 78 with the exception that it is disposed only over the energy absorbing body 25 and the spindles 90 and does not include the front mounting bracket 28 and the rear mounting bracket 34. After the energy absorbing body 25 is covered by the moisture proof covering 78', the front mounting bracket 28 is disposed over the front portion of the energy absorbing body 25 and the rear mounting bracket 34 is disposed over the rear portion of the energy absorbing body 25 exterior to the coating 78'. Holes are provided in both the upper and lower surfaces of the front mounting bracket 28 and also the rear mounting bracket 34 to align with the central bore formed within the spindle 90. Thereafter, a bolt 92 is disposed through the central bore of each of the spindles 90, and nuts 94 and 96 disposed on either ends thereof and torsioned to a predetermined tension. This is operable to maintain the upper surfaces thereof in a secure relationship with the energy absorbing body 25.

Figure 12:
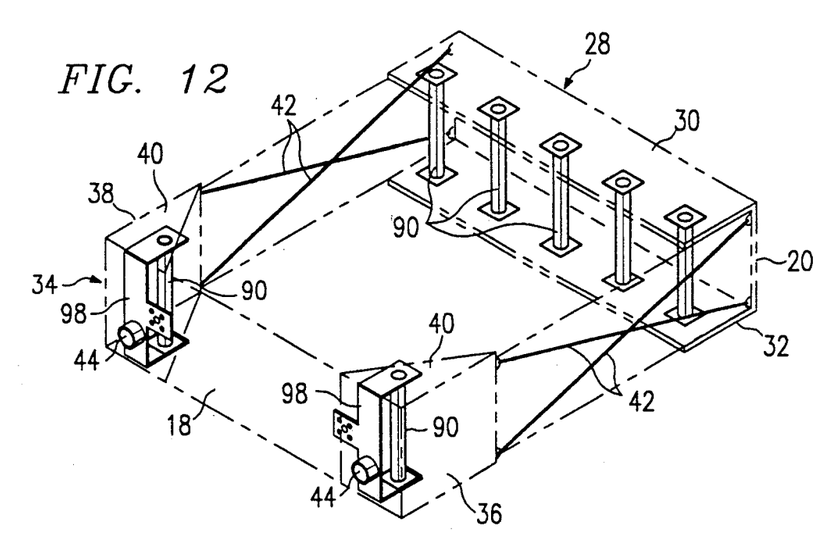
FIG. 12 illustrates a perspective view of the embodiment of FIG. 11.

Referring now to FIG. 12, there is illustrated a perspective view of the assembled crash attenuator of FIG. 11, with the energy absorbing body 25 removed to show the assembly details. It can be seen that a plurality of spindles 90 are disposed along the front portion of the energy absorbing body 25 and in a line parallel with the front portion 20 of the front mounting bracket 28 and disposed an equal distance therefrom. Holes aligning with the central bores of the spindles 90 are provided on both the upper plate 30 and lower plate 32. In the rear portion of the energy absorbing body 25, one spindle 90 is disposed on either corner. The alignment holes are disposed through the connecting brackets 40 such that the connecting brackets 40 are secured to the bolts inserted through the central bore of the spindles 90. To provide support for the tail lights 44, and rear mounted adjustable jack stands, a bracket 98 is provided that interfaces the upper and lower ends of each of the spindles 90 on the rear corners of the crash attenuator.

In the embodiment of FIG. 12, the impact plate 18 is fabricated from plywood. Therefore, the plates 36 and the connecting brackets 40 are riveted or bolted to the plywood impact plate 18. The plywood impact plate 18 functions similar to the aluminum impact plate 18 described above in that it operates to spread an impact across the rear surface of the energy absorbing body 25, thus taking full advantage of the energy absorbing effect thereof.

Figures 13, 14:
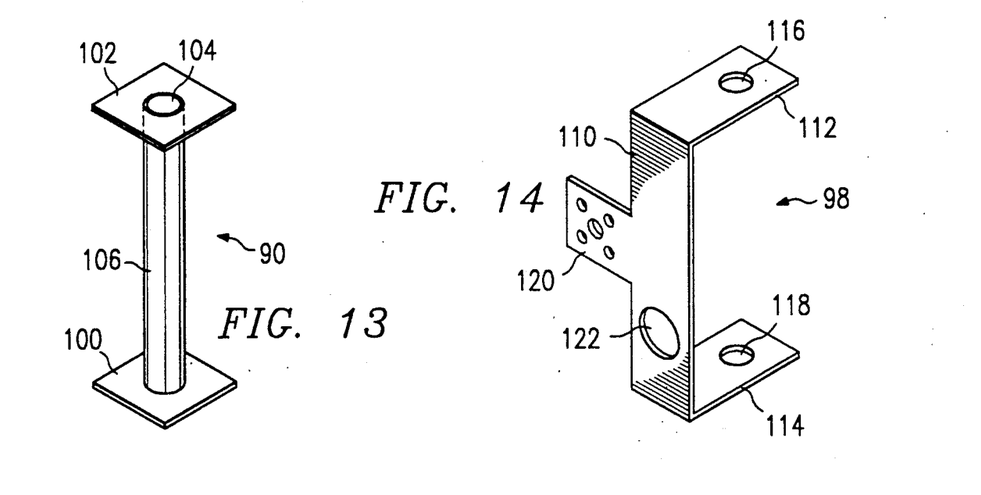
FIG. 13 illustrates a perspective of one of the spindles.
FIG. 14 illustrates a perspective view of the supporting bracket for the tail light and the jack stand.

Referring now to FIG. 13, there is illustrated a detail view of the spindle 90. The spindle 90 is comprised of a lower support plate 100 and an upper support plate 102. The upper support plate 102 has hole 104 disposed therethrough and the plate 100 has a similar hole disposed therethrough (not shown). A cylindrical member 106 connects the hole 104 to the hole in the lower support plate 100. The bore through the cylindrical member 106 provides a passageway for the bolt 92.

During assembly, the dimension between the upper support plate 102 and the lower support plate 100 is approximately 24 inches with the bore internal to the cylindrical member being approximately 1 inch. During assembly, the plate 102 at the upper surface thereof and the plate 100 at the lower surface thereof are coplanar with respect to the surfaces of the energy absorbing body 25. The hole 104 and the hole in the plate 100 are covered during application of the water proof material 78'. In this manner, the bore of the cylindrical member 106 can be later uncovered to allow insertion of the bolt 92 therethrough. Further, the plates 100 and 102 will be below the surface of the water proof material 78' and thus completely covered.

Referring now to FIG. 14, there is illustrated a detailed diagram of the mounting bracket 98. The bracket 98 has a perpendicular surface 110 which is connected at the upper end thereof to the edge of a horizontal bracket 112 and at the lower edge thereof to a horizontal bracket 114. Horizontal bracket 112 has an orifice 116 disposed therethrough, and a similar orifice 118 is disposed in horizontal bracket 114. The orifices 116 and 118 align with the central bore in the cylindrical member 106 in an associated spindle 90.

The bracket 98 has a mounting bracket 120 disposed thereon that is coplanar with the vertical bracket 110 and extending inward toward the center of the impact plate 18. The bracket 120 is provided for mounting such things as a jack stand, etc., (not shown) to allow support of the rearmost portion of crash attenuator 10. An orifice 122 is provided in the bracket for aligning and securing the tail light 44.

Figure 15:
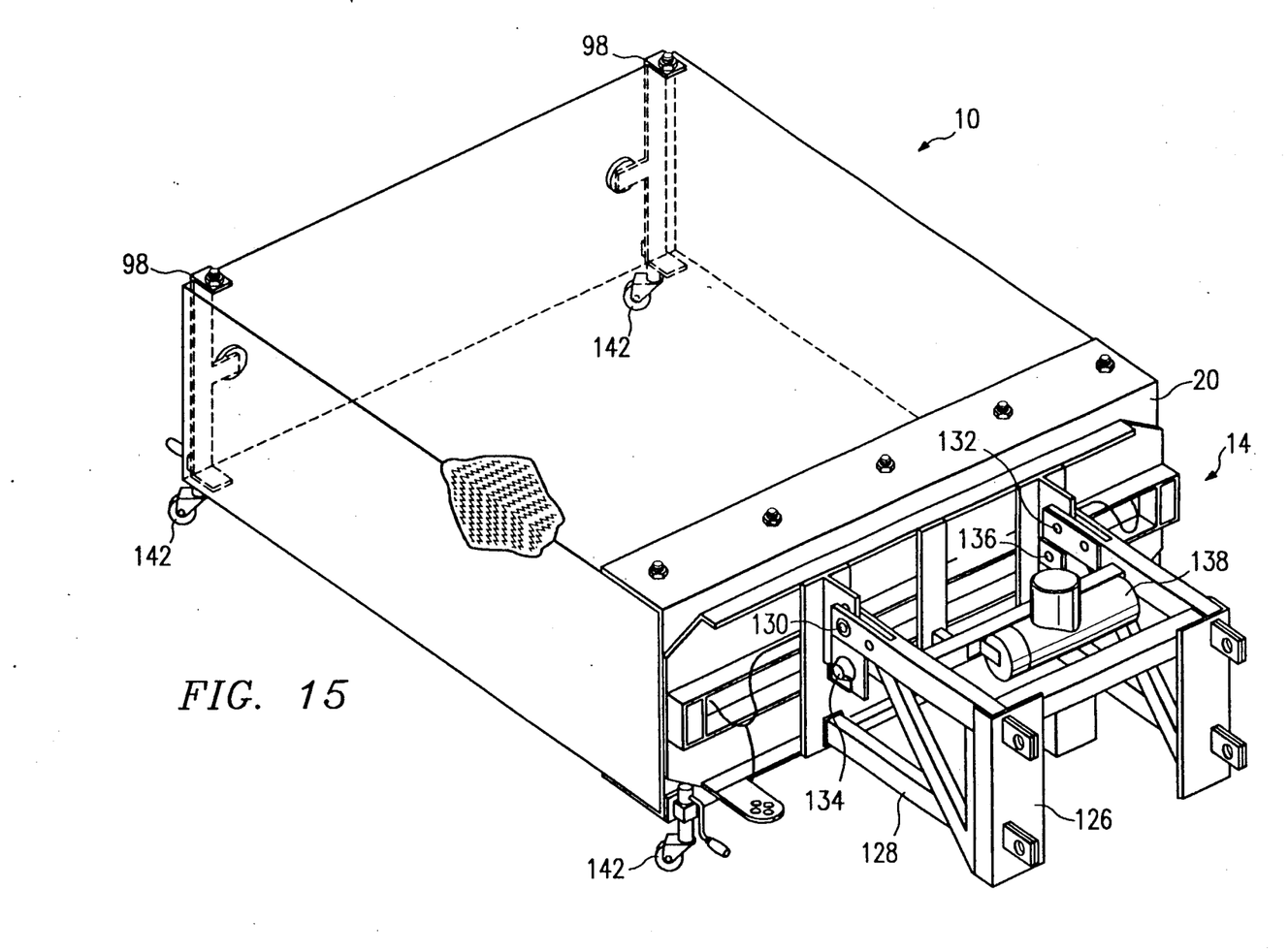
FIG. 15 illustrates a perspective view of the raising and lowering mechanism.

Referring now to FIG. 15, there is illustrated a detail of the mounting bracket 14. The mounting bracket 14 is comprised of a secured bracket 126 which is operable to be mounted onto the truck. A pivoting bracket 128 is provided which is attached to the mounting plate 20. The two devices are pivoted at a pivot point 130 on one side of the secured bracket 126 and at a pivot point 132 on the other side thereof. A locking pin 134 is provided on one side of the secured bracket 126 and a locking pin 136 is provided on the other side thereof. Locking pins 134 and 136 prevent rotation of the mounting plate upward, and also pivoting in the pivoting holes 130 and 132.

A hydraulic motor 138 is provided which has a piston associated therewith for pushing downward on the portion of the pivoting bracket 128 disposed nearestmost the secured end of the secured mounting bracket 126. This causes pivoting of the pivoting bracket 128 outward and away from the truck. This allows the bracket to be raised in an upward position.

In the embodiment illustrated in FIG. 15, adjustable wheels 142 are provided on each corner of the attenuator 10. These are mounted to the V-bracket 98 on the rearmost side of the attenuator 10 and to the mounting plate 20 on the forwardmost end. The wheels 142 are adjustable such that when the attenuator is removed from the truck and the secured mounting bracket 14 disconnected from the truck, the crash attenuator 10 can be easily handled.

The crash attenuator of the present invention was tested in a head on test at nominal speeds of 45 mph with a 4500 pound car. The crash attenuator was affixed to a dump truck laden with sand bags to a weight of 14,000 pounds, excluding the weight of the crash attenuator or its associated mounting structure 14. The crash configuration was head on in line with the center line of the dump truck and the crash attenuator (i.e., the impact angle was 0°. The dump trucks were parked in second gear with their emergency brake set. The results of the test are summarized in Table 1:

TABLE 1

| | |
|---|---|
| Impact Speed (mph) | 45.7 |
| Occupant Impact Velocity (ft/sec) | 34.6 |
| Onset (msec) | 146 |
| Occupant Ride Down Acceleration (g) | −1516 |
| Duration (msec) | 167–177 |
| Maximum 50-msec Average Longitudinal Acceleration (g) | −13.2 |
| Duration (msec) | 146–196. |

In summary, there has been provided a crash attenuator that includes an enclosure having contained therein a plurality of layers of adjacently disposed fibrous cellular material. Each of the layers is comprised of longitudinal cells hexagonal in cross section with the longitudinal axis thereof disposed horizontal to the ground when in the crash attenuating position. Each of the layers is separated by a single sheet of material such that the layers are vertically stacked running from front to back on the crash attenuator. A rear impact plate is provided to spread the force of impact across the rear surface of the attenuator material with a front mounting plate provided. The rear impact plate and the rear mounting plate are secured together on the sides thereof by tension cables to hold the impacting material therebetween. A moisture proof covering is provided over the entire structure to prevent moisture from entering. Provision is made for pressurizing the interior of the crash attenuator for the purpose of determining if leaks occur.

Although the preferred embodiment has been described in detail, it should be understood that various changes, substitutions and alterations can be made therein without departing from the spirit and scope of the invention as defined by the appended claims.

What is claimed is:

1. A crash attenuator, comprising:
   an impact plate defining the rear of the crash attenuator and for being disposed substantially perpendicular to the direction of impact and for dispersing the impact force over a wide surface area;
   a mounting plate for defining the front of the crash attenuator and having a surface area at least equal to that of said impact plate and parallel thereto;
   an energy absorbing body fabricated from a fibrous cellular material comprised of a plurality of adjacent elongated cells having fibrous walls, said energy absorbing body disposed between said impact plate and said mounting plate with the longitudinal axis of said adjacent elongate cells in the fibrous cellular material oriented in a plane perpendicular to said impact plate and said mounting plate;
   means for securing said mounting plate and said impact plate onto said energy absorbing body such that the fibrous cellular material of said energy absorbing material is secured firmly therebetween;
   a substantially moisture proof covering for covering at least said energy absorbing body to prevent moisture from invading said fibrous cellular material in said energy absorbing body; and
   a mounting bracket for connecting said mounting plate to a substantially immovable surface such that said mounting bracket, said mounting plate and said impact plate are disposed a predetermined distance above ground with the planes thereof substantially perpendicular to the surface of the ground.

2. The crash attenuator of claim 1 wherein said moisture proof covering covers said energy absorbing body, said mounting plate and said impact plate.

3. The crash attenuator of claim 1 wherein said impact plate is fabricated from a soft aluminum.

4. The crash attenuator of claim 1 wherein said impact plate is rectangular in shape and said mounting plate is rectangular in shape wherein said means for securing comprises:
   first cabling means for being attached on one end thereof to one side of said impact plate on the outer edge thereof, and on the other end thereof to said mounting plate on the same side of said energy absorbing body;
   second cabling means for being attached on one end thereof to the other side of said impact plate on the outer edge thereof, and on the other end thereof to the other side of said mounting plates;
   first torsion means for torsioning said first cabling means to a predetermined tension; and
   second torsion means for torsioning said second cabling means to a predetermined tension.

5. The crash attenuator of claim 4 wherein said first and second cabling means each comprise:
   first and second cables;
   said first cable connected between the upper outside corner of said impact plate on the associated side of said energy absorbing body and the lower outside corner of said mounting plate to a first bolt which extends through said mounting plate;
   said second cable connected between the lower outside corner of said impact plate on the associated side of said energy absorbing body and a bolt that extends through said mounting plate proximate to the upper corner thereof on the associated side of said energy absorbing body;
   a first nut for being threadably engaged to said first bolt for torsioning said first cable; and
   a second nut for being threadably engaged with said second bolt on the outside of said impact plate to tension said second cable.

6. The crash attenuator of claim 1 wherein said fibrous cellular material is a cellulose based material.

7. The crash attenuator of claim 1 wherein said fibrous cellular material is comprised of a plurality of layers, each of said layers comprised of a honeycomb fibrous material having a plurality of adjacently disposed longitudinal cells disposed adjacent each other, the longitudinal axis of said cells being disposed parallel to the surface over which the crash attenuator is disposed, each of said layers having a separation sheet fabricated of fibrous cellular material disposed on either end of said longitudinal cells with said separation sheets adhesively connected together between adjacent ones of said layers.

8. The crash attenuator of claim 7 wherein select portions of select ones of said layers have said honeycomb fibrous material removed therefrom to leave a void, said void modifying the absorption capacity of said energy absorbing body.

9. The crash attenuator of claim 1 and further comprising a pressure indication device for communicating with the interior of said energy absorbing body and displaying the pressure interior thereto such that the pressure can be viewed exterior to the crash attenuator.

10. The crash attenuator of claim 9 wherein said pressure indication device comprises a pressure gauge for being disposed on the exterior of said moisture proof material and communicating with the interior of said energy absorbing body.

11. The crash attenuator of claim 9 and further comprising a pressurizing orifice for allowing the interior of said energy absorbing body to be pressurized to a predetermined pressure.

12. The crash attenuator of claim 9 and further comprising a pressure relief valve for allowing air to exit the interior of said energy absorbing body when the internal pressure therein exceeds a predetermined threshold value.

* * * * *